United States Patent [19]
Tipton

[11] 3,731,813
[45] May 8, 1973

[54] FLOATING DEBRIS RECOVERY APPARATUS

[76] Inventor: Robert R. Tipton, 249 El Caminito, Livermore, Calif. 94550

[22] Filed: May 17, 1971

[21] Appl. No.: 143,910

[52] U.S. Cl..............................210/242, 210/DIG. 21
[51] Int. Cl. ...............................................C02b 9/02
[58] Field of Search.................210/242, 83, DIG. 21

[56] References Cited

UNITED STATES PATENTS

| | | | |
|---|---|---|---|
| 3,656,624 | 4/1972 | Walton | 210/242 |
| 3,539,048 | 1/1970 | Pearson | 210/242 |
| 61,880 | 2/1867 | Serrell | 210/242 |
| 3,219,190 | 1/1965 | Thune | 210/242 |

FOREIGN PATENTS OR APPLICATIONS

| 833,918 | 5/1960 | Great Britain | 210/242 |
|---|---|---|---|

*Primary Examiner*—Reuben Friedman
*Assistant Examiner*—T. A. Granger

[57] ABSTRACT

A marine vessel is equipped with a holding basin into which floating pollutants are urged by a rotating skimmer with a floating wier along the edge of the basin used to separate the floating liquid debris from the surface of the water and allow it to flow into a collection tank. A conveyor is used to remove the solid debris from the holding basin.

9 Claims, 12 Drawing Figures

Patented May 8, 1973
3,731,813
3 Sheets-Sheet 1
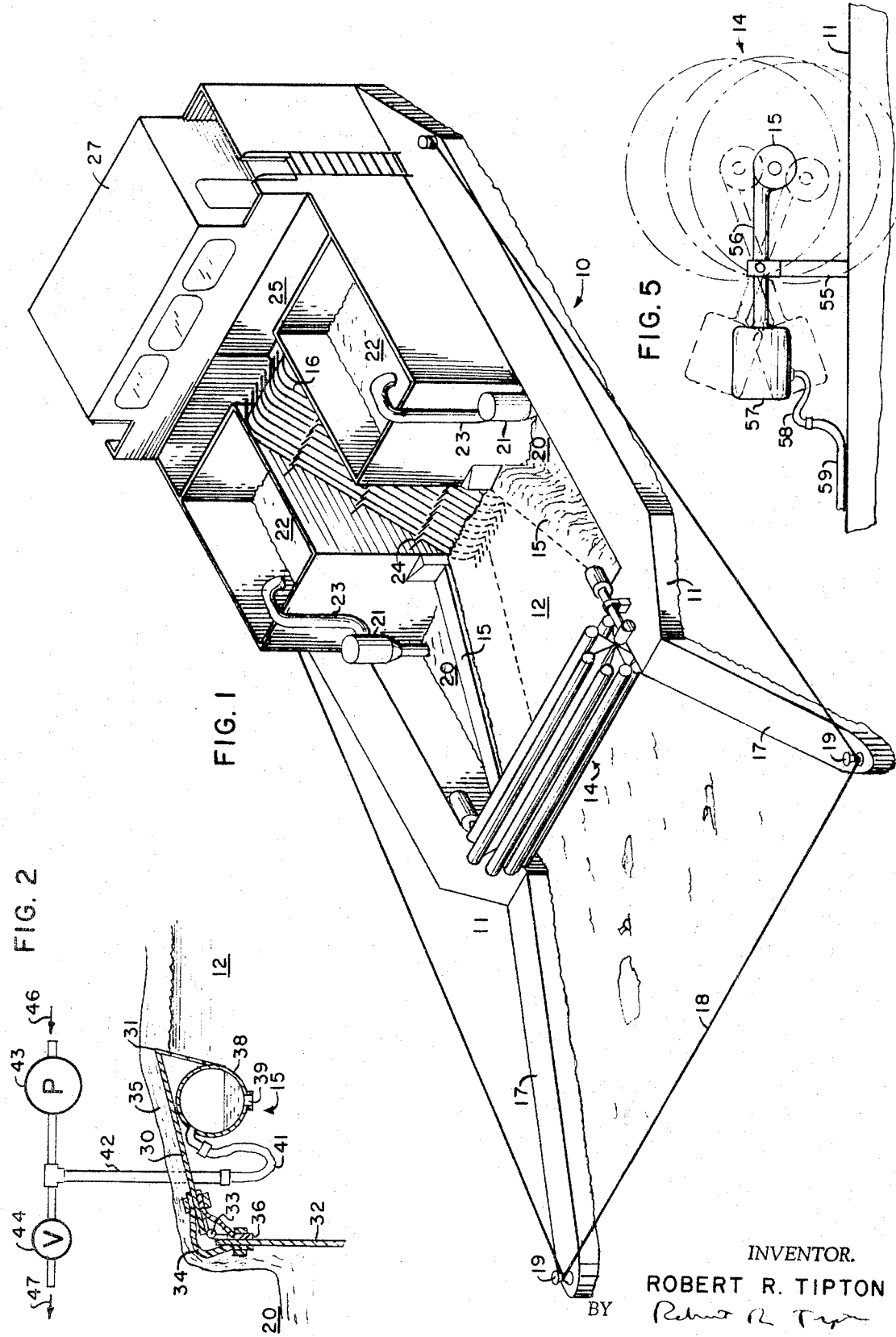
INVENTOR.
ROBERT R. TIPTON
BY Patented May 8, 1973

INVENTOR.
ROBERT R. TIPTON
BY

Patented May 8, 1973
3,731,813
3 Sheets-Sheet 3
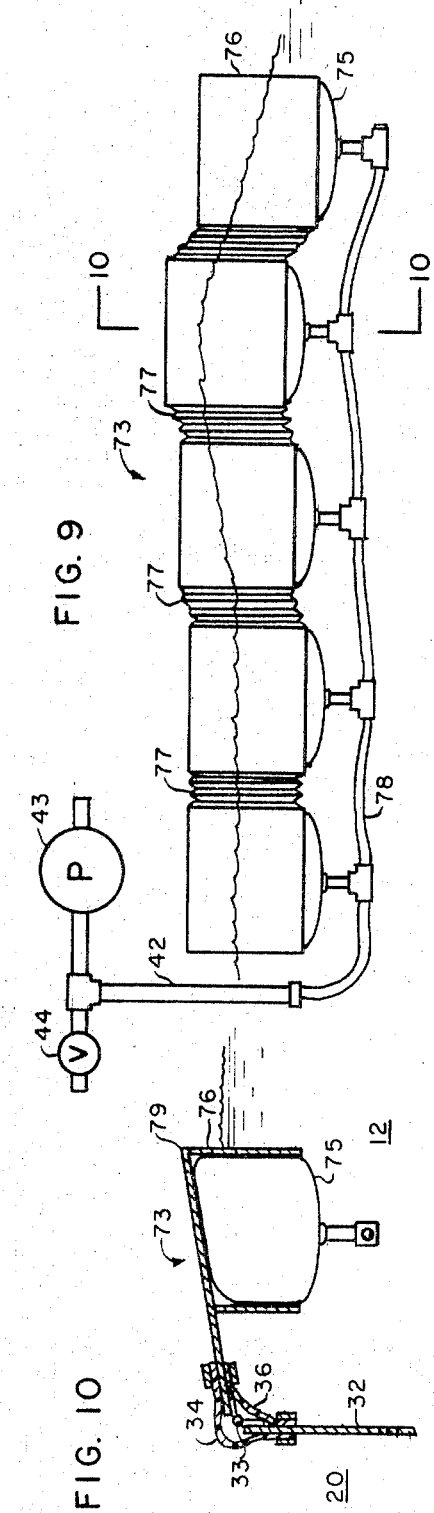
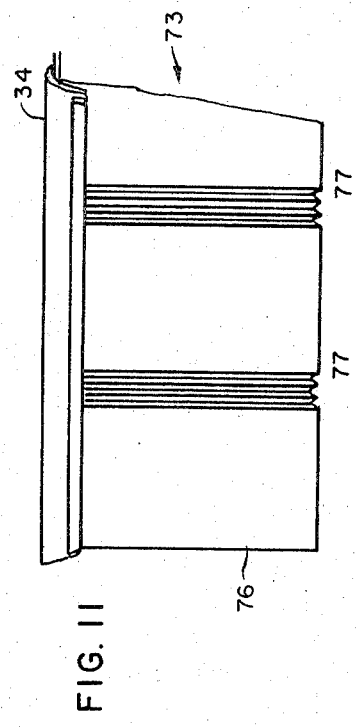
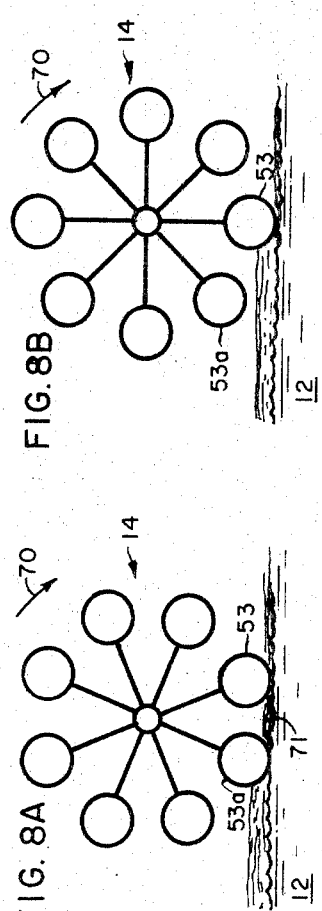
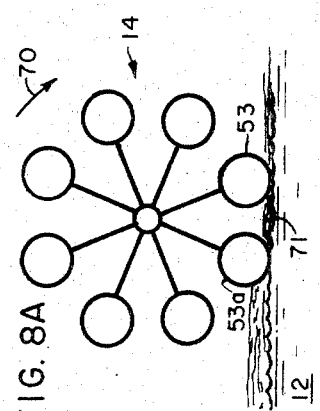
INVENTOR.
ROBERT R. TIPTON
BY

FLOATING DEBRIS RECOVERY APPARATUS

BACKGROUND OF THE INVENTION

This invention relates to debris removal equipment and in particular to apparatus for removing floating liquid and solid debris from water.

With an increase awareness of ecology and the need for maintaining a livable environment, the pollution of waterways, bays, lakes, and oceans by liquid and solid floating debris has become a problem of increasing magnitude.

Although steps have been taken in an attempt to eliminate this problem by enacting restrictive legislation and establishing pollution control boards having police powers to enforce antipollution laws, they can only prevent the willful pollution or threatened pollution of waterways but cannot prevent accidental or involuntary pollution such as that occurring from oil spills, debris caused by storm damage or individual unenforceable littering of the waterways.

The prior art methods of clearing liquid debris from the surface of the water comprised the use of floating booms looped and pulled by marine vessels in conjunction with the use of suction devices for sucking the floating liquid debris from the surface or the use of an absorbant material such as straw in order to form a semi-solid material that could be removed in chunks. None of these techniques are 100 percent effective in removing all of the floating pollutants in that they are not effective to concentrate thin film pollutants for recovery.

SUMMARY OF THE INVENTION

The apparatus and method of the present invention concentrates the liquid floating debris in a holding basin where the floating liquid debris is separated from the water near the surface of the water and collected in a holding tank. The apparatus uses either a non-floating or floating skimmer for concentrating the floating liquid debris in a holding basin where it is separated from the water by a floating weir, with the solid debris being removed by mechanical conveyor means. The floating weir and skimmer are arranged to be effective in rough as well as calm water.

It is, therefore, an object of the present invention to provide an apparatus for removing floating debris from water.

It is another object of the present invention to provide an apparatus for removing liquid floating debris from water.

It is a further object of the present invention to provide an apparatus for concentrating and removing floating debris from water.

These and other objects of the present invention will become manifest upon study of the following specification when taken together with the drawings.

BRIEF DESCRIPTION OF THE DRAWINGS

FIG. 1 is an isometric view of the debris removal apparatus of the present invention;

FIG. 2 is an elevational partial section through a typical floating wier;

FIG. 5 is a partial side elevational view of the skimmer drive showing the method of driving the rotating skimmer and concurrently allowing for vertical movement of the skimmer due to wave action of the water;

FIGS. 8A and 8B are diagrammatic cross-sectional views of the skimmer showing its concentrating action on the surface of the water;

FIG. 9 is a front elevational view of a floating wier that is movable with wave action of the water;

FIG. 10 is a section through the floating wier of FIG. 9 taken at line 10—10; and FIG. 11 is a top view of the floating wier of FIG. 9.

DESCRIPTION OF THE PREFERRED EMBODIMENT

Figure 3:
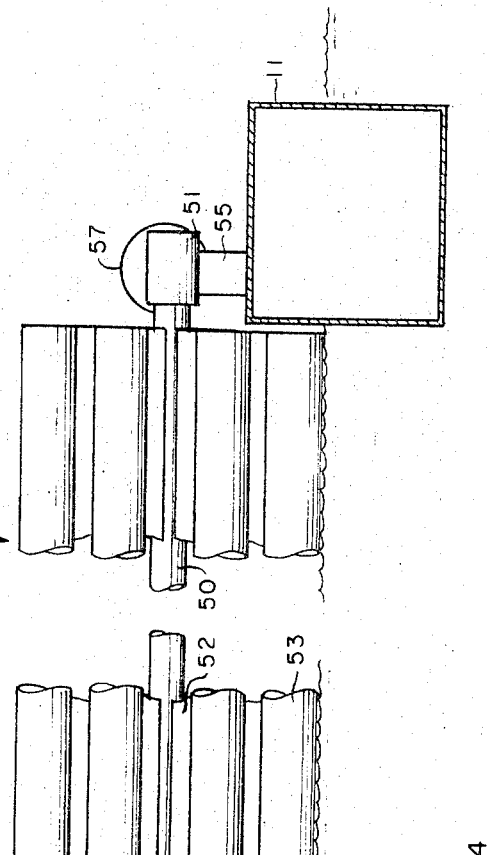
FIG. 3 is a front elevational view of the skimmer.

With reference to FIG. 1, the apparatus of the present invention comprises basically a marine vessel 10 having forwardly extending side portions 11 defining an open bottom holding basin 12, at the front of which is a rotating floating skimmer 14 and at the sides of which are floating wiers 15, ending at the rear of basin 12 with a solid waste conveyor 16. Floating booms 17, extending forwardly from the front of side portions 11, are arranged to funnel the floating debris into basin 12 and can be adjusted as to their front opening and angle they make with side portions 11 by cable 18 connected to capstans 19.

Preliminary collection tanks 20 are provided in the space behind wiers 15 and within side portions 11 into which the liquid debris is held immediately after it is separated from the surface of the water. Liquid debris pumps 21 are provided to pump liquid debris from preliminary collection tanks 20 into liquid debris storage tanks 22 through pipes 23.

The solid floating debris which is channeled to the back of basin 12 is picked up by solid waste conveyor 16 using scoops 24 and is deposited in solid waste storage tank 25.

The prime mover, used to drive vessel 10 through the water and operate the equipment for rotating skimmer 14 and pumps 21, is housed in pilot house 27 which also houses the crew and apparatus for steering the vessel and controlling the equipment.

With reference to FIG. 2, there is shown a section through a typical floating wier 15 between holding basin 12 and liquid debris preliminary collection tank 20.

Wier 15 comprises, basically, a spillway 30 sloping toward collection tank 20 and having a lip 31 at the "water" or holding basin 12 side of the wier with the opposite end of spillway 30 pivotally connected to side 32 of holding tank 20 by hinge 33. A flexible gasket 34 on top of hinge 33 is provided to prevent contamination of the hinge by liquid debris 35 flowing over wier 15, while gasket 36 is provided under hinge 33 to prevent water in basin 12 or debris from interfering with the action of hinge 33. The gaskets also prevent the leakage of water from holding basin 12 into tank 20.

Buoyancy tank 38 is attached to the underside of wier 15 and is provided with opening 39 at its lower side which opens into holding basin 12. At the upper part of tank 38 is an opening 40 to which is attached flexible air hose 41, in turn connected to air conduit 42.

An air pump 43 is connected to conduit 42 and is arranged to furnish compressed air to tank 38 while an air valve 44, also connected to air conduit 42, is arranged to let air out of tank 38. Thus the buoyancy of tank 38 and therefore the height of lip 31 above the surface of the water in basin 12 can be raised by pumping air into tank 38 using pump 43 or it can be lowered by letting air out of tank 38 by opening air valve 44, as indicated by arrows 46 and 47, respectively.

Figure 4:
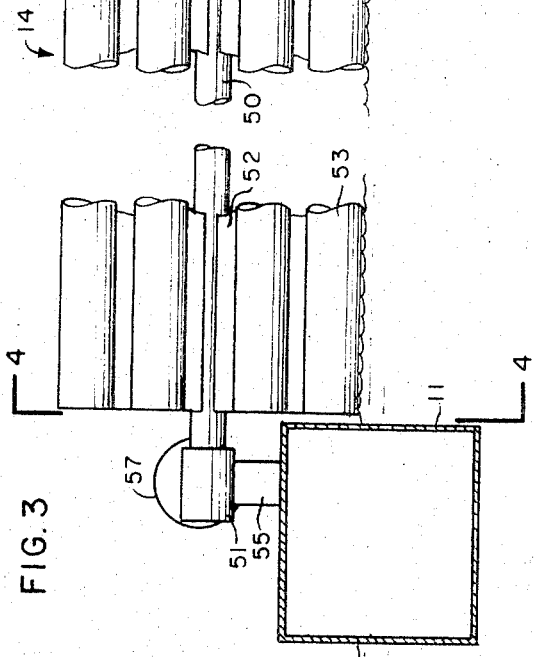
FIG. 4 is a side elevational view of the skimmer.

With reference to FIGS. 3 and 4, there is shown a front elevational view of rotating skimmer 14 as it is supported by side portions 11.

Skimmer 14 comprises a central supporting shaft 50 connected at each end to drive gear housing 51.

Attached to shaft 50 and extending radially outwardly therefrom are equally spaced float support arms 52 at the outer ends of which are attached skimmer floats 53. The buoyancy of each float 53 is arranged to be sufficient to support the entire weight of rotating skimmer 14 on the water. The weight of skimmer 14, in particular, the force which skimmer 14 exerts on the water, can be adjusted as will be described below.

It can be seen that as vessel 10 travels through the water, it will be tossed about by wind and waves and also, as it is loaded with waste material, it's water line, or the level that it rests in the water, will vary. Therefore, Skimmer 14, if it is to remain floating or in contact with the surface of the water, it must be permitted to move vertically up and down.

FIG. 5 illustrates one method of allowing vertical movement of skimmer 14.

FIG. 5 is a side elevational view of the means for supporting skimmer 14 at each end of its central supporting shaft 50, and comprises a stanchion 55 pivotally supporting drive housing 56, one end of which is attached to drive gear housing 51 while the other end of which is attached to the housing of drive motor 57. Power to drive motor 57 is provided by wires (not shown) contained in flexible conduit 58 attached to rigid conduit 59 which is connected to a power source (not shown) and controls (not shown) common in the art.

It can be seen from FIG. 5 by the phantom lines, that drive motor 57 and skimmer 14 are free to rotate about the pivotal connection of drive housing 56 to stanchion 55 permitting vertical movement of skimmer 14.

It can also be seen that for the above lever-fulcrum arrangement, by adjusting the ratio of the lever arm length between stanchion 55 and gear drive motor 57 and stanchion 55 and drive gear housing 51, a balance can be achieved whereby the weight or force exerted by skimmer 14 on the water can be increased or reduced. For example, increasing the length of the arm between drive motor 57 and stanchion 55 will decrease the force that skimmer 14 will exert on the water. Thus the force skimmer 14 exerts on the water can be adjusted so that it will float on the water but not on the liquid debris floating on the surface of the water and, at the same time, be free to swing up and down as the surface of the water rises or falls with relation to side portions 11.

Figure 6:
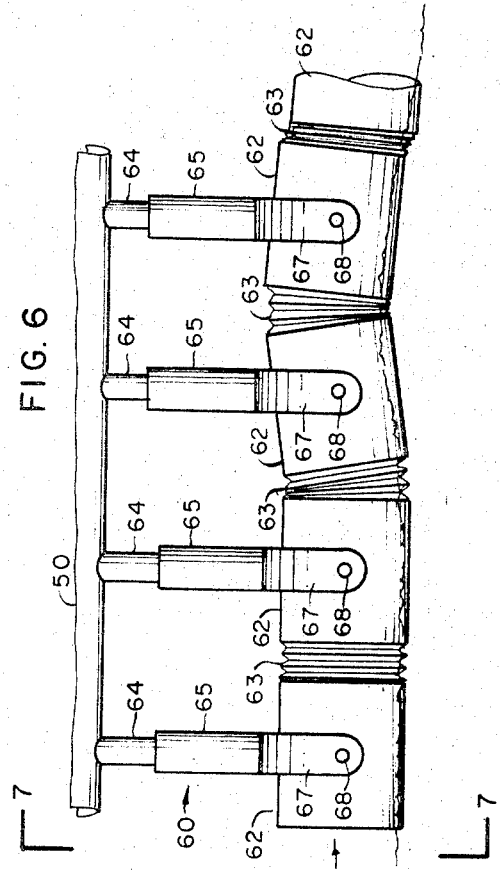
FIG. 6 is a front elevational view of a skimmer float that is movable with wave action of the water.
Figure 7:
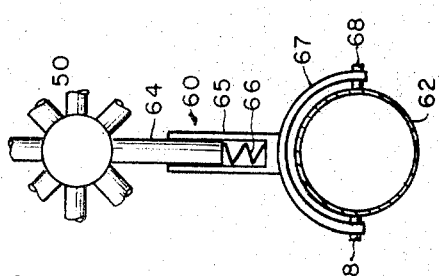
FIG. 7 is a section through FIG. 6 taken at line 7—7.

Since the height of a wave between side portions 11 under skimmer 14 will generally not be even, FIGS. 6 and 7 illustrate apparatus for insuring that float 53 will follow the varying curvature of the surface of the water.

Support shaft 50 now has attached to it a plurality of adjustable length float support arms 60 at the ends of which is skimmer float assembly 61 which comprises movable skimmer floats 62 pivotally connected at their midpoints to yoke 67 by pin 68 with each skimmer float 62 connected to its neighbor by accordion barrier 63.

Each adjustable length float support arm 60 comprises a fixed arm 64 telescopically disposed in a sliding arm 65 with a spring 66 disposed in sliding arm 65 and biased against the end of arms 64 and 65 to urge arms 64 and 65 apart. Yoke 67 is attached to the end of arm 65 and is pivotally connected to float 62 by pins 68 as previously described.

It can be seen that as skimmer assembly 61 encounters a wave, pin 62 can move freely with the wave since it can pivot about pin 68 and can move in a relatively flexible manner with its neighbor restricted only by accordion barrier 63. Accordion barrier 63 will prevent any leakage of liquid debris between floats 62 out of basin 12.

Thus skimmer float assembly 61 will be in continuous contact with the surface of the water so that no floating debris will be able to pass back out of holding basin 12 or will be disturbed by turbulence of the water which would result if skimmer 14 cut too deeply into the water (or if a rigid skimmer were used).

For thick films of more viscous liquid debris, a rigid skimmer may be used in which rigid paddles may be used to urge the debris into holding basin 12.

Skimmer 14, is thus not limited to be floating, but may include non-floating paddles.

The action of skimmer 14 in trapping and urging liquid waste into holding basin 12 is best seen from FIGS. 8A and 8B.

With reference to FIG. 8A, skimmer 14 is rotated in the direction of arrows 70. Since skimmer 14 is arranged to be free to move vertically with the water surface, one float 53 will always be in contact with the water.

At the position shown in FIG. 8A, two floats are in contact with the water between which is trapped floating debris 71. As skimmer 14 continues to rotate, the weight of skimmer 14 will be transferred to the forward float and from the rearward float. Since a float 53 is always in contact with the surface of the water, the floating liquid debris will be urged to the left (in the FIGS. 8A and 8B) and when all the weight of skimmer 14 is supported by float 53, the floating material will be urged into the floating debris already in holding basin 12 as shown in FIG. 8B.

To allow for wave action against wier 15 and reduce the amount water that would be collected with the liquid debris, FIGS. 9, 10 and 11 illustrate the apparatus for achieving a flexible wier 73.

Flexible wier 73 comprises a plurality of inflatable floats 75 supporting individual wierlettes or wier sections 76 pivotally connected to containment tank wall 32 by hinges 33 with flexible gaskets 34 and 36 covering hinges 33 to protect it from debris and water as was the case previously described for wier 15.

Each individual wierlette or wier section 76 is connected to its neighbor by a flexible accordion barrier 77 and each inflatable float 75 is connected to its neighbor by flexible air hose 78 which is also connected to conduit 42 leading to air pump 43 and valve 44 in a manner similar to that shown in FIG. 2.

Thus each wierlette or wier section 75 is free to move up and down relative to its neighbor with flexible barrier 77 between preventing water from passing between wierlette or wier section 75 into containment tank 20.

Thus it can be seen that a wave will cause individual wierlettes or wier sections to rise and fall to maintain lips 79 at a relatively fixed distance above the wave surface because of the buoyancy of the individual wierlette or wier section. The elevation of lip 79 above the surface of the water can be varied by regulating the amount of air into floats 75 by the use of pump 43 and valve 44 as previously described for FIG. 2.

To operate the apparatus of the present invention, vessel 10 is provided with a prime mover (not shown) common in the art, to cause it to move forward in the water, with booms 17 constituting the bow of the vessel. Rotating skimmer 14 is powered to rotate and urge floating debris into basis 12.

As material enters basin 12, the floating liquid debris will generally be of equal thickness over the surface of the water in basin 12.

The elevation of lip 31 of floating wire 15 (or lip 79 of wierlette 76) above the surface of the water in basin 12 can be adjusted using air pump 43 and valve 44 as previously described to allow the floating liquid debris to flow over wier 15 (or wierlette or wier section 76) with a minimum of water being carried over with it.

The solid floating debris, as the liquid debris is removed, will migrate toward conveyor 16 where it will be scooped out by conveyor 16 and deposited in tank 25.

As preliminary tank 20 collects liquid debris, pumps 21 may then be energized to pump the debris through pipes 23 into tanks 22.

Thus, solid and liquid floating debris are conveniently collected and removed from the surface of the water.

I claim:

1. An apparatus for removing floating debris from the surface of a body of water comprising
a marine vessel with means defining an inlet opening in the bow of said vessel in communication with the surface of said body of water and also with means defining an open holding basin within said hull
means defining an open liquid debris collection tank adjacent said holding basin with an upper edge of said collection tank adjacent an upper edge of said basin and in fluid communication therewith,
a floating wier pivotally connected to the upper edge of said collection tank adjacent the upper edge of said basin,
means defining a buoyance tank constructed and arranged on the underside of said wier whereby said floating wier defines a spillway for the flow of fluid from said basin to said tank, and,
means for increasing and decreasing the buoyance of said buoyance tank.

2. The apparatus as claimed in claim 1 wherein said wier is disposed at an angle to the direction of travel of said marine vessel.

3. The apparatus as claimed in claim 1 wherein said wier comprises
a spillway having an upper end and a lower end,
a lip at the upper end of said spillway, and,
means for pivotally connecting the lower end of said spillway to said collection tank.

4. The apparatus as claimed in claim 1 wherein portions of said wier are free to move up and down independently of other portions of said wier.

5. The apparatus as claimed in claim 1 wherein said wier comprises
a plurality of individually movable wier sections.

6. The apparatus as claimed in claim 5 wherein said wier further comprises
a flexible barrier connected between each of said wier sections.

7. The apparatus as claimed in claim 1 further comprising
a shaft disposed across said inlet opening in the bow of said vessel having its axis of rotation generally parallel to the surface of said water,
a plurality of elongated buoyant skimmer members connected to said shaft and disposed thereabout, at least one of said elongated skimmer members floating on the surface of said water and supporting said shaft and said plurality of elongated buoyant skimmer members connected thereto, and
means for rotating said shaft and plurality of skimmer members in a direction to urge said floating debris into said holding basin.

8. The apparatus as claimed in claim 7 wherein portions of each of said elongated skimmer members are free to move up and down independently of other portions of said skimmer in reaction to wave action of said water along the length of said skimmer member.

9. The apparatus as claimed in claim 7 wherein each of said elongated buoyant skimmers comprises
a plurality of buoyant float members radially movable relative to said shaft, the longitudinal axis of said plurality of float members coincident with a plane containing said axis of rotation of said shaft, and,
a flexible barrier connected between adjacent float members.

* * * * *